May 26, 1931.  W. G. HIATT  1,807,528
PROCESS OF TREATING SULPHUR BEARING GASES
Filed Nov. 21, 1927
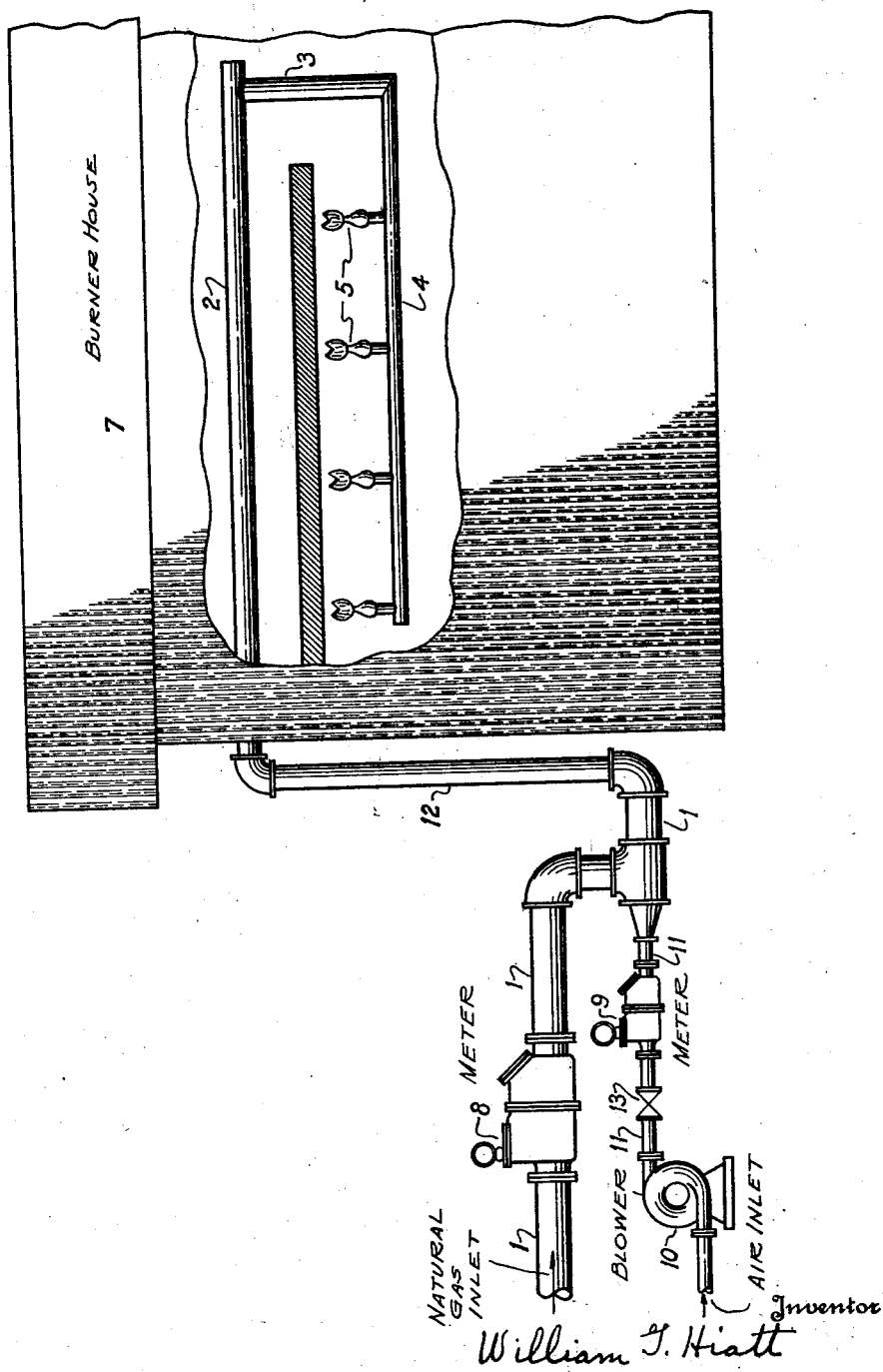

Patented May 26, 1931

1,807,528

UNITED STATES PATENT OFFICE

WILLIAM G. HIATT, OF BARTLESVILLE, OKLAHOMA, ASSIGNOR TO PHILLIPS PETROLEUM COMPANY, OF BARTLESVILLE, OKLAHOMA, A CORPORATION OF DELAWARE

PROCESS OF TREATING SULPHUR BEARING GASES

Application filed November 21, 1927. Serial No. 234,872.

Processes of this general type have been directed in the past to the more or less complete removal of the sulphur, or sulphur bearing compounds, from the gas. For certain uses of gas, such as domestic heating and certain industrial heating operations, it is necessary to so remove the sulphur and sulphur bearing compounds. Existing methods are not particularly applicable to gases having limited markets in relation to their supply, and which consequently command low prices. The use of natural gas as a raw material in the production of carbon black is a particular example. The methods in existence for the more or less complete removal of the sulphur bearing compounds contained in fuel gases are so expensive as not to be adaptable to such conditions.

In the manufacture of carbon black, as an example, when the natural gas used as a raw material contains appreciable quantities of hydrogen sulfide, considerable difficulties have been encountered due to the fact that at the elevated temperatures existing within the burner houses, the hydrogen sulfide decomposes as the gas passes through the supply pipes to the burners. This results in the deposition of free sulphur and the formation of iron sulfide. The ensuing corrosion of pipes and stoppage thereof has been a serious problem of the manufacturer. It is to be noted that a partial stoppage of the piping and burner not only reduces the rate of consumption of the gas but also causes unequal distribution of gas to the burners which results in reduced yields. Despite these difficulties, the cost of raw materials has been so low and manufacturing equipment has been so inexpensive that carbon black manufacturers have not found it profitable to employ the costly processes hereinbefore mentioned for removing the sulphur bearing compounds from the gases treated.

I have found that the selective oxidation of the sulphur bearing compounds of fuel gases can be effected by adding regulated amounts of air to the flowing gas, passing the mixture to a heated zone and maintaining the heated mixture at an elevated temperature until the reaction (oxidation) is complete.

In the selective oxidation of the sulphur bearing compounds, (and particularly hydrogen sulfide) in fuel gases the temperature at which the reaction takes place at a predetermined rate varies inversely as the amount of oxygen present in excess of the theoretical amount required for oxidizing the hydrogen sulfide to water and sulphur dioxide. The most important chemical reaction involved is as follows:

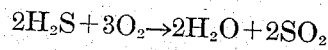

$$2H_2S + 3O_2 \rightarrow 2H_2O + 2SO_2$$

Accordingly, one and a half volumes of oxygen (or about seven and a half volumes of air) are theoretically required to effect the complete combustion, (oxidation) of one volume of hydrogen sulfide. I have found it necessary to use a slight excess of air to obtain uniformly complete combustion of the sulphur bearing compounds, although in the instance of carbon black manufacture, larger excesses are not detrimental. Oxygen can be used in the place of air but I prefer to use air because it is less expensive and less hazardous.

The air-gas mixture is passed to a heated zone in which the temperature is maintained above 350° F. Higher temperatures than 350° F. have been found not to be detrimental and under some conditions, are desirable. Temperatures up to 850° F. have been employed satisfactorily.

At this stage of the process the sulphur bearing compounds have been selectively oxidized. The products of this selective combustion are principally water and sulphur dioxide in a superheated gaseous state. At ordinary temperatures, water and sulphur dioxide unite chemically to form sulphurous acid which in the presence of an excess of oxygen would be oxidized to some extent to sulfuric acid. At temperatures somewhat above the condensation point of considerable proportions of the water in the gas, however, the products of the selective combustion are maintained substantially in a superheated gaseous condition thereby preventing the formation of harmful quantities of sulfurous and sulfuric acids, which in themselves are very corrosive to iron and other metals. I have found that the stoppage of heated gas conduits due to the decomposition of sulphur bearing compounds and the formation of metallic sulfides can be avoided by the selective combustion of the sulphur-bearing compounds as above described, and maintaining the temperature of the gas thus treated above the condensation temperature of the water present in the gas, until the gas is consumed.

While my process may be carried out at any pressure, I prefer for economic reasons to use pressure slightly above atmospheric pressure. The cost of equipment is thereby kept at a minimum.

I have not found it necessary, in the case of carbon black plants, to devise special equipment for supplying the heat necessary in my process other than to conduct the air-gas mixture through a series of coils placed in the burner houses of the carbon black plant, wherein the temperature is usually in excess of 500° F. The heat thus utilized is otherwise wasted.

In rare instances, fuel gases, due to inleakage of air or for other reasons, contain free oxygen in quantities sufficient to effect the selective oxidation of the sulphur bearing compounds. In such instances, the addition of air is unnecessary in my process. As I have pointed out, an excess of oxygen is not detrimental. It is only necessary to ascertain that the gas passing to the heating zone contains at least the minimum amount of oxygen hereinbefore set forth.

For purposes of illustration, the figure of the accompanying drawing diagrammatically portrays the application of my process to the manufacture of carbon black. In the drawing, natural gas, for example, enters the system through conduit 1, passing through meter 8. Regulated amounts of air are forced into conduit 1, through conduit 11. The air is forced into conduit 11 by means of blower or compressor 10, and is measured by meter 9. The regulation of the volume of air is effected by valve 13. The gas-air mixture passes through conduit 12, to the burner house 7. Inside the burner house, conduit 12, conducts the gas to heated zone conduit 2, which is any suitable device for imparting the heat of the surroundings to the gas-air mixture. At the elevated temperatures thus attained, the sulphur bearing compounds in the gas are selectively oxidized. From heated zone conduit 2, the resultant mixture, still at an elevated temperature, is passed through conduit 3, to distributor 4, and thence to burners 5, where the fuel gas is consumed. Under the temperature conditions existing in the system between heated zone conduit 2, and the burners 5, the water and sulphur dioxide, formed by the selective combustion of the sulphur bearing compounds in the heated zone, are maintained substantially in a superheated gaseous condition. The harmful effects of sulfurous and sulfuric acids are thereby avoided, and the whole process has served to eliminate the troubles due to the presence of sulphur bearing compounds in the gas.

While I have described my invention in reference to its particular application in the manufacture of carbon black from natural gas, I do not limit myself to this use of the invention. My invention can be used in any industry where fuel gas containing sulphur bearing compounds is available and the gas can be consumed under the prescribed conditions. To be advantageously employed, the conditions of consumption of the fuel gas must be such that the products of selective combustion of the sulphur bearing compounds must be less harmful to the process than the sulphur bearing compounds themselves.

It is well known that sulphur dioxide is a raw material in the manufacture of sulfuric acid. My invention, under favorable economic conditions, could lead to the manufacture of sulfuric acid as a by-product of the fuel consuming industry.

What I claim and desire to secure by Letters Patent is:

1. A continuous process for the selective complete oxidation of the sulphur bearing compounds (and particularly hydrogen sulfide) in natural gas to prevent decomposition of the sulphur compounds and the attendant formation of sulphur and sulfides which occurs when the gas is heated in the distributing line which comprises adding regulated amounts of air to the gas, passing the gas-air mixture at temperatures above 350° F. through a reaction zone, and maintaining said mixture at temperatures above the condensation point of the water vapor therein until the gas is substantially consumed.

2. A continuous process for the selective complete oxidation of the sulphur bearing compounds (and particularly hydrogen sulfide) in fuel gases to prevent the decomposition of the sulphur compounds and the attendant formation of sulphur and sulfides which occurs when the gases are heated in the distributing line which comprises adding regulated amounts of air to the gas, passing the gas-air mixture at temperatures above 350° F. through a reaction zone, and maintaining said mixtures at temperatures above the condensation point of the water vapor therein until the gas is substantially consumed.

3. A continuous process for the selective complete oxidation of the sulphur bearing compounds (and particularly hydrogen sulfide) in any fuel gas to prevent the decomposition of the sulphur compounds and the attendant formation of sulphur and sulfides which occurs when the gas is heated in the distributing line which comprises adding regulated amounts of air to the gas, passing the gas-air mixture at temperatures above 350° F. and below the temperature necessary to effect the combustion of the gas itself, through a reaction zone, and maintaining said mixtures at temperatures above the condensation point of the water vapor therein until the gas is substantially consumed.

4. A process as claimed in claim 3, in which the heat for the reaction zone is supplied by waste heat evolved in the combustion of the fuel gas.

5. A continuous process for the selective combustion of the sulphur bearing compounds (and particularly hydrogen sulphide) in natural gas, to prevent the decomposition of the sulphur compounds and the attendant formation of sulphur and sulfides which occurs when the gas is heated in the distributing line, which consists in adding to the gas a quantity of air sufficient to effect complete oxidation of the hydrogen sulfide and sulphur compounds contained in the gas, passing the gas-air mixture at temperatures above 350° F. and below the temperature necessary to effect the combustion of the gas itself, through a reaction zone, maintaining said mixtures at temperatures above the condensation point of the water vapor contained therein until the gas is consumed, and substantially consuming said gas in a carbon black plant.

6. In a continuous process for the selective combustion of the sulphur bearing compounds (and particularly hydrogen sulphide) in natural gas, to prevent the decomposition of the sulphur compounds which occurs when the gas is heated in the distributing line, adding to the gas a quantity of air sufficient to effect complete oxidation of the hydrogen sulphide and sulphur compounds contained in the gas, passing the gas-air mixture through a reaction zone at temperatures above 350° F. and below the temperature necessary to effect the combustion of the gas itself, and substantially consuming the gas thus treated in a carbon black plant without lowering its temperature.

WILLIAM G. HIATT.